United States Patent
Rigakos

[19]
[11] Patent Number: 6,038,351
[45] Date of Patent: Mar. 14, 2000

[54] APPARATUS AND METHOD FOR MULTI-ENTITY, MIXED DOCUMENT ENVIRONMENT DOCUMENT IDENTIFICATION AND PROCESSING

[75] Inventor: Elias C. Rigakos, Indian Shores, Fla.

[73] Assignee: Cash Management Solutions, Clearwater, Fla.

[21] Appl. No.: 08/959,128

[22] Filed: Oct. 28, 1997

[51] Int. Cl.[7] ................................................. G06K 9/22
[52] U.S. Cl. .......................... 382/305; 382/137; 382/173; 382/209; 382/317
[58] Field of Search .................................. 382/305–306, 382/321, 203, 317, 209, 128, 311, 282–283, 170, 173–177, 183, 190, 197–199, 224–228, 287–291; 707/104, 3, 5, 513–520, 500–506, 530; 364/478.01, 478.15, 478.12, 963.1, 225, 225.2–225.4; 235/375–379, 470, 473–477, 478–480, 454, 432, 449; 209/534

[56] References Cited

U.S. PATENT DOCUMENTS

| | | | |
|---|---|---|---|
| 4,088,982 | 5/1978 | Haas | 382/437 |
| 4,428,077 | 1/1984 | Shimada et al. | 382/173 |
| 4,523,330 | 6/1985 | Cain | 382/140 |
| 4,542,829 | 9/1985 | Emery et al. | 209/534 |
| 4,731,858 | 3/1988 | Grasmueller et al. | 382/151 |
| 4,933,984 | 6/1990 | Nakano et al. | 382/175 |
| 4,949,392 | 8/1990 | Barski | 382/283 |
| 5,073,953 | 12/1991 | Westdijk | 382/176 |
| 5,097,517 | 3/1992 | Holt | 382/137 |
| 5,109,439 | 4/1992 | Froessl | 382/305 |
| 5,235,653 | 8/1993 | Nakano et al. | 382/175 |
| 5,274,567 | 12/1993 | Kallin et al. | 364/478.01 |
| 5,317,646 | 5/1994 | Sang, Jr. | 382/175 |
| 5,323,473 | 6/1994 | Lau | 382/175 |
| 5,390,259 | 2/1995 | Withgott et al. | 382/173 |
| 5,394,487 | 2/1995 | Burger et al. | 382/209 |
| 5,455,871 | 10/1995 | Bloomberg et al. | 382/173 |
| 5,502,777 | 3/1996 | Ikemure | 382/173 |
| 5,555,362 | 9/1996 | Yamashita et al. | 707/517 |
| 5,555,556 | 9/1996 | Ozaki | 382/173 |
| 5,628,008 | 5/1997 | Hayashi | 707/513 |
| 5,644,765 | 7/1997 | Shimura et al. | 707/104 |
| 5,841,905 | 11/1998 | Lee | 382/203 |

*Primary Examiner*—Leo H. Boudreau
*Assistant Examiner*—Ishrat Sherali
*Attorney, Agent, or Firm*—Dennis G. LaPointe; Joseph C. Mason, Jr.; Mason & Associates, P.A.

[57] ABSTRACT

An apparatus and method for processing documents which automatically identifies, separates and processes different document types from a single business entity or multiple business entities is disclosed.

6 Claims, 15 Drawing Sheets

Microfiche Appendix Included
(4 Microfiche, 180 Pages)

CASH MANAGEMENT SOLUTIONS, INC.
13921 ICOT BLVD., STE 710
CLEARWATER, FL 34520

0345

DATE

PAY TO THE
ORDER OF _____ $ _____

_____ DOLLARS

ANY BANK - U.S.A.
00-7565/0000
VOID

MEMO

CASH IN (CREDITS TO PROOF)

```
  C  Cash
 M   Management _____ (813) 524-1103
  S  Solutions, Inc.

☐  Check Box for Change of Address    22915953  060196  006147  00609528

Date: 06/01/96
  John Q. Public              Account: 22915953
  100 Main Street             Minimum Due: $61.47
  Any Town, U.S.A.            Balance: $609.52

Amount Enclosed: ☐☐☐☐☐☐
```

*Fig. 6*

```
                                          START OF BATCH TICKET
                      ○

| | | | 484-0045769 |
|---|---|---|---|
| 73 FONT | 8 765 432 109 | 0123456789 | OCR Test Document |

| 1403 FONT | 0987654321 | 0987654321 | 0987654321 | $ |

| 1428 FONT | 0123456789 | 0123456789 | 0123456789 | 0123456789 |

OCRA ALPHA FONT

%+{}/ &*- ZYXWVUTSRQPONMLKJIHGFEDCBA 9876543210

| OCRA FONT | 1234567890 | 1234567890 | 1234567890 | 1234567890 |

OCRA LASER FONT    1817961114    0013128000150000020003

| OCRB / OCRB SPECIAL FONT | JNPJNP | 1234567890 | 1234567890 | 1234567890 | #+<> #+<> #+<> |

OCRA ALPHA / IBRD FONT

9876543210 ZYXWVUTSRQPONMLKJIHGFEDCBA 9876543210+>< :])(*&%/- X

Fig. 8

APPARATUS AND METHOD FOR MULTI-ENTITY, MIXED DOCUMENT ENVIRONMENT DOCUMENT IDENTIFICATION AND PROCESSING

MICROFICHE APPENDIX REFERENCE

This application contains a microfiche appendix which is incorporated herein by reference. The microfiche appendix contains a total of 4 microfiche and a total of 180 frames.

BACKGROUND OF THE INVENTION

1. Field of the Invention

This invention relates, generally, to an apparatus and method for identifying, processing and sorting documents. More particularly, it relates to an apparatus and method which automatically identifies, processes and separates different document types of multiple business entities.

2. Description of the Related Art

Numerous devices and methods have been developed which attempt to overcome the labor costs and human error problems associated with manual document identification, separation and processing. For example, devices and methods such as those disclosed in U.S. Pat. Nos. 5,097,517; 4,542,829; and 4,088,982 recognize numeric information, printed patterns, and characters, respectively for processing and sorting. Devices such as those disclosed in U.S. Pat. Nos. 5,455,871; 5,390,259; 5,073,953; and 4,731,858 analyze document image data by segmentation. U.S. Pat. Nos. 5,394,487; 5,317,646; 5,235,653; 4,949,392; and 4,933,984 disclose devices and methods which analyze and identify documents using various forms of template recognition. Other devices and methods, such as those disclosed in U.S. Pat. Nos. 5,628,008; 5,555,556; 5,555,362; 5,502,777; 5,323,473; 5,274,567; 4,523,330 and 4,428,077 disclose various means for identifying, sizing, processing and sorting documents. However, none of these prior art devices and methods are able to identify, process and sort multiple documents from a single business entity and/or multiple business entities in a mixed document environment.

Thus, what is needed then is an apparatus and method for processing and sorting documents including, but not limited to, multiple coupons, multiple checks, multiple cash-in tickets and multiple batch tickets of a single entity and/or of multiple entities.

In view of the prior art as a whole at the time the present invention was made, it was not obvious to those of ordinary skill in the pertinent art how the needed apparatus and method could be provided.

SUMMARY OF THE INVENTION

In accordance with the present invention, a data processing apparatus and method of document identification for multi-entities in a mixed document environment is disclosed. The data processing system includes means for entering a plurality of information parameters from a plurality of known documents, means for storing in memory the plurality of information parameters from the plurality of known documents to create a first data list containing a discrete entry for each information parameter of each known document, means for reading a plurality of information parameters from a plurality of unknown documents, means for storing in memory the plurality of information parameters from the plurality of unknown documents to create a second data list containing a discrete entry for each information parameter of each unknown document, means for sequentially comparing each discrete entry of the second data list with each discrete entry of the first data list, means responsive to the sequential comparing means for determining if a match exists between a discrete entry of the second data list and a discrete entry of the first data list, whereby each unknown document is identified.

The data processing method of the present invention includes the steps of entering a plurality of information parameters from a plurality of known documents, storing in memory the plurality of information parameters from the plurality of known documents to create a first data list containing a discrete entry for each information parameter of each known document, reading a plurality of information parameters from a plurality of unknown documents, storing in volatile memory the plurality of information parameters from the plurality of unknown documents to create a second data list containing a discrete entry for each information parameter of each unknown document, sequentially comparing each discrete entry of the second data list with each discrete entry of the first data list to determine if a match exists, whereby each unknown document is identified.

The invention accordingly comprises the features of construction, combination of elements and arrangement of parts that will be exemplified in the description hereinafter set forth, and the scope of the invention will be indicated in the claims.

BRIEF DESCRIPTION OF THE DRAWINGS

For a fuller understanding of the nature of the invention, reference should be made to the following detailed description, taken in connection with the accompanying drawings, in which:

FIG. 4 is a check;

FIG. 5 is a cash-in ticket;

FIG. 6 is a coupon;

FIG. 7 is a batch ticket; and

FIG. 8 shows an example of a test document which is used to verify the functioning of the system and method of the present invention.

DETAILED DESCRIPTION OF THE INVENTION

Figure 1A:
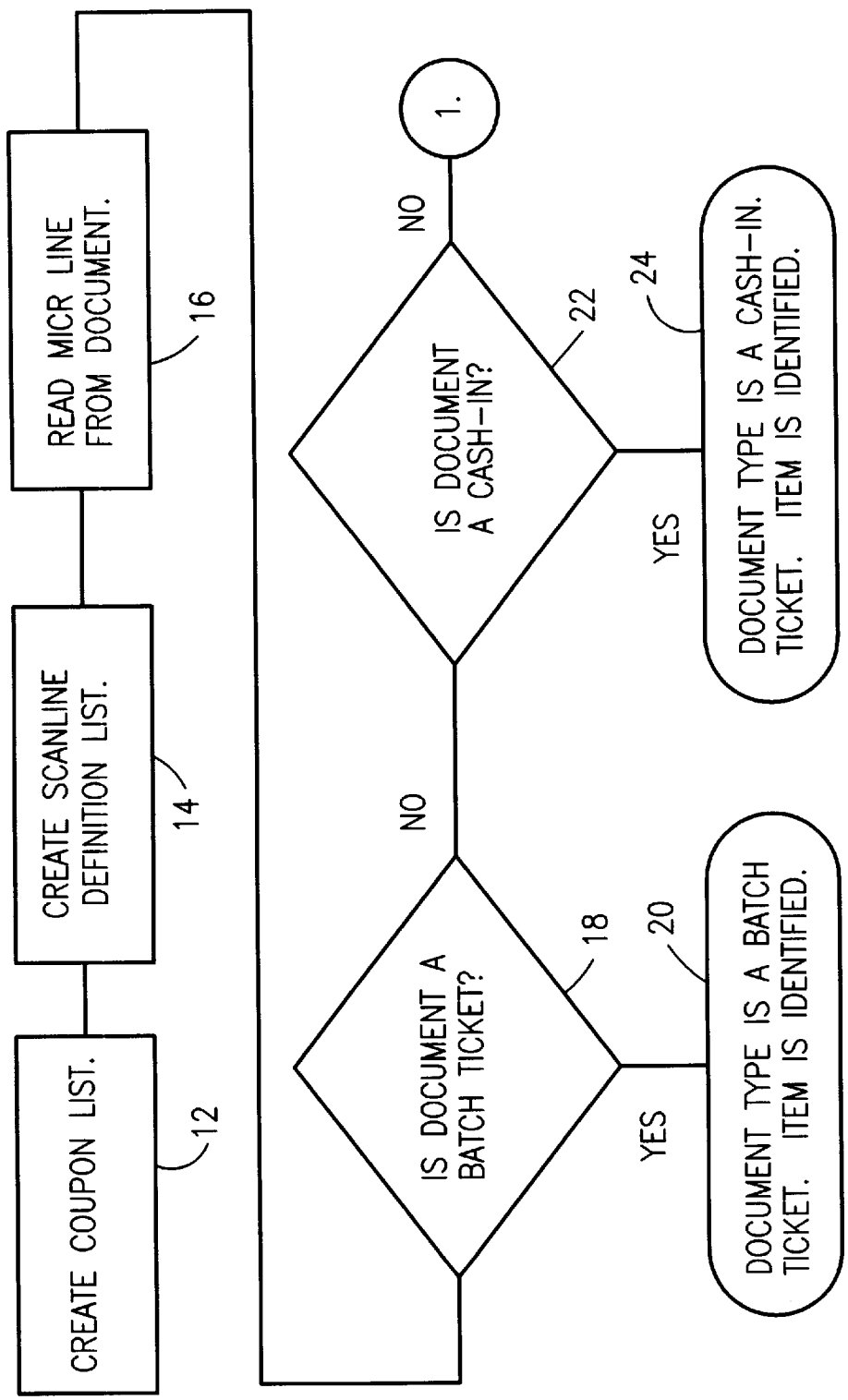
FIG. 1A–D is a document identification logic diagram main flowchart of the present invention.
Figure 1B:
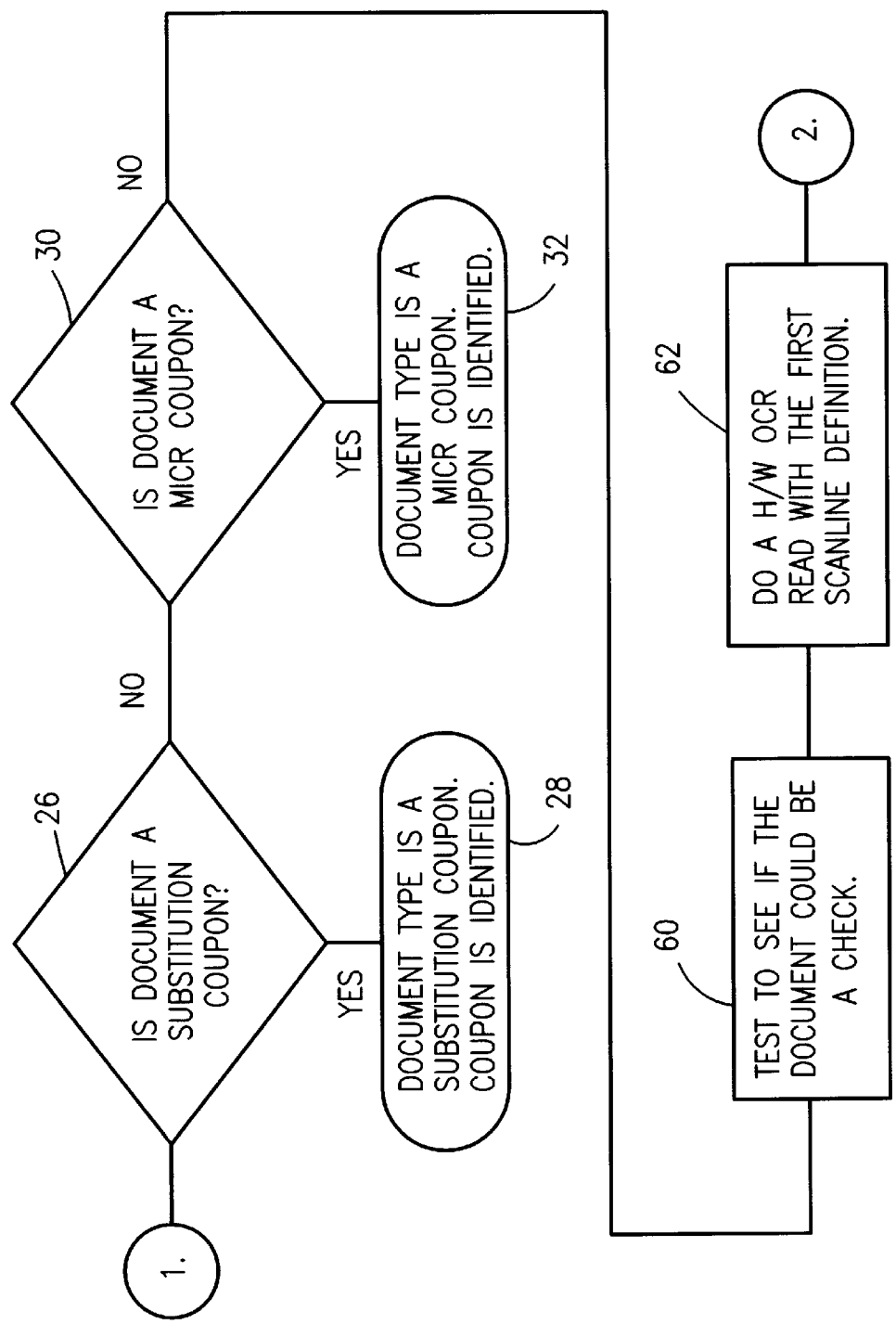
Figure 1C:
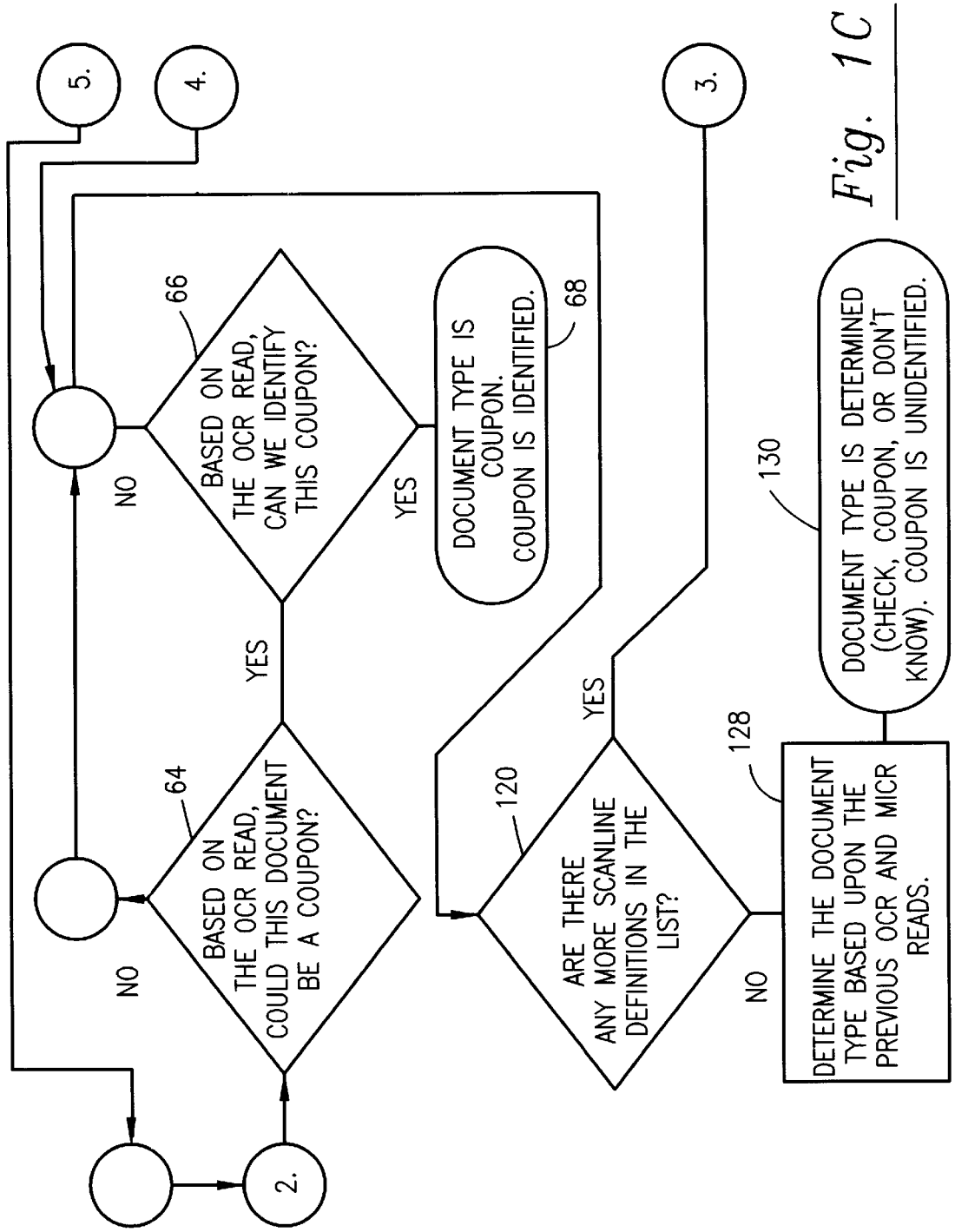
Figure 1D:
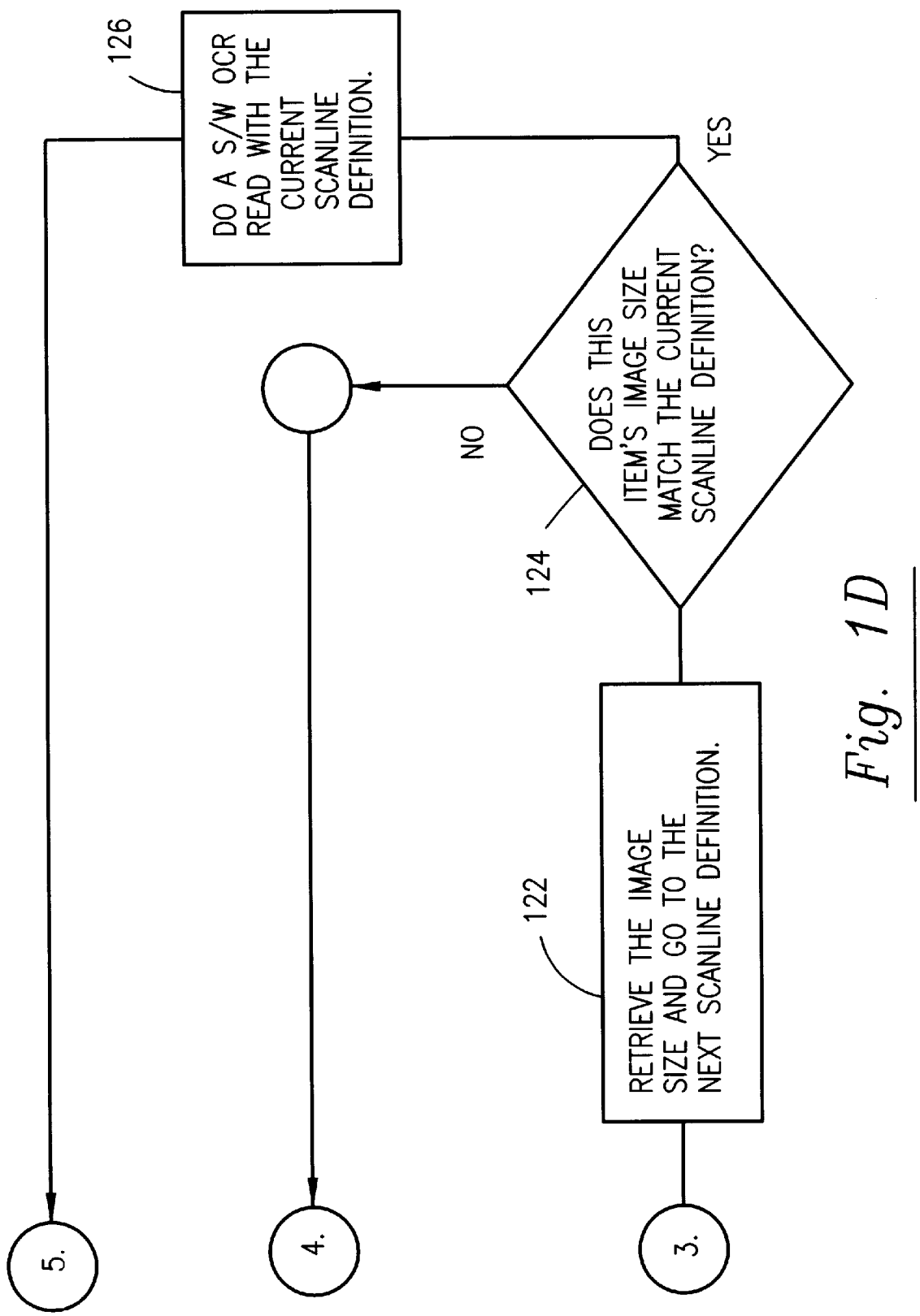

The present invention provides an apparatus and method which automatically identifies, processes and sorts a variety of documents including, but not limited to checks, coupons and cash-in tickets. These documents can be from different corporate entities, different lockbox types, different coupon types, and contain different font or mixtures and combinations of these various types and fonts. The invention can identify, process and sort these different documents by physical size criteria, format criteria, such as, but not limited to the size and location of data on the document. Further, the invention can identify, process and sort these different documents by font criteria such as OCR or MICR. The method and apparatus of the invention utilizes scanning techniques and comparisons against predetermined values using an algorithm.

With the foregoing overview in mind, the detailed operation of the system and method of the present invention can best be understood by referring to FIG. 1 which illustrates the present invention in the context of document identification, processing and sorting from lockbox remittances of multi-users and mixed environments. Although multi-user, mixed environment lockbox remittance processing is the particular embodiment illustrated and described herein, it will be apparent to those skilled in the art how the present invention can be adapted, within the scope of the invention, to other multi-user, mixed environment document identification, processing and sorting systems. The advantages of the present inventive system may be achieved by the use of a standard personal computer with 16 megabytes of random access memory. Further, it will be evident to those skilled in the art that the system of the present invention may be interfaced with various known devices, including but not limited to scanners, sorters and other document handling devices and equipment.

The invention will be further clarified by a consideration of the following detailed construction which is intended to be purely exemplary of the apparatus and use of the invention.

Referring now to the drawings, in which like numerals refer to like elements thereof, FIG. 1 is a document identification logic diagram main flowchart showing the methodology and structure of the present invention. As illustrated in FIG. 1, a coupon list of defined or known coupons is created at block 12. The coupon list will contain information for every defined coupon including, but not limited to, lockbox number, coupon number within the lockbox, agency coupon flag, substitute coupon flag, positive flag, checkdigit flag, MICR on coupon flag, document width, and document height information. In addition, the coupon list will include scanline specific information, including but not limited to, scanline font, scanline position in pixels, scanline height in pixels, scanline width in pixels, minimum number of characters in scanline, maximum numbers of characters in scanline, embedded decimal flag, scanline mask and field parameter information. The field parameter information may include information for up to, but not limited to, 15 fields, including, but not limited to, field type, field starting column, length of field and other field specific information.

After the coupon list of known or defined coupons is created at block 12, a scanline definition list of known or defined coupons is created at block 14. Every scanline definition will include information regarding, but not limited, scanline font, scanline position in pixels, scanline height in pixels, scanline width in pixels. In addition, the list of scanline definitions will include a list of coupon image sizes. The list of coupon image sizes are derived from coupons that are defined by the same scanline information, for example, scanline font, scanline position, scanline height and scanline width.

The scanline definition is used to read optical character recognition (OCR). However, the OCR is only read from the unidentified document if it has been determined that the unidentified document could be that document corresponding to the current scanline definition. Therefore, before trying to read OCR with a scanline definition, the size of the unidentified document is obtained and checked against all of the size data in the scanline definition list. If the unidentified document is approximately the same size, then the OCR is read. If the unidentified document is not approximately the same size, then the OCR is not read.

After the scanline definition list is created, the magnetic ink character recognition (MICR) line is read from the unidentified document as illustrated at block 16. It is then determined if the unidentified document is a batch ticket at block 18. Specifically, batch tickets are determined from the read of the MICR scanline. The apparatus and method of the present invention encodes a special arrangement of characters on the batch tickets when the batches are created. Therefore, when the batch ticket is presented during processing the apparatus and method of the present invention recognizes this special character sequence. If the unidentified document is a batch ticket, the unidentified document is identified as illustrated at block 20.

If it is determined at block 18 that the unidentified document is not batch ticket, the unidentified document is further processed at block 22 to determine if it is a cash-in ticket. Specifically, a cash-in ticket is a pre-coded document used for internal bank processing. Cash-in tickets are encoded with a pre-determined mask of characters. For example, the first four (4) characters of a cash-in ticket mask for a particular banking institution might always be 5010. The apparatus and method of the present invention then uses this pre-determined mask and determines whether or not the unidentified document is a cash-in ticket based on the MICR read. If the unidentified document is a cash-in ticket, the document is identified as illustrated at block 24.

If the unidentified document is not a cash-in ticket the unidentified document is further processed as illustrated at block 26 of FIG. 1. In particular, it is determined at block 26 if the unidentified document is a substitution coupon. A substitution coupon is a replacement document for an original remittance coupon, which may or may not have a scanline. The apparatus and method of the present invention, upon identifying that the unidentified document is a coupon but not identifying the unidentified document as a particular coupon, encodes a special sequence of characters on the MICR line. These characters are read in the subsequent passes for document identification. If it is determined that the unidentified document is a substitution coupon the unidentified document is identified as illustrated at block 28.

Figure 2A:
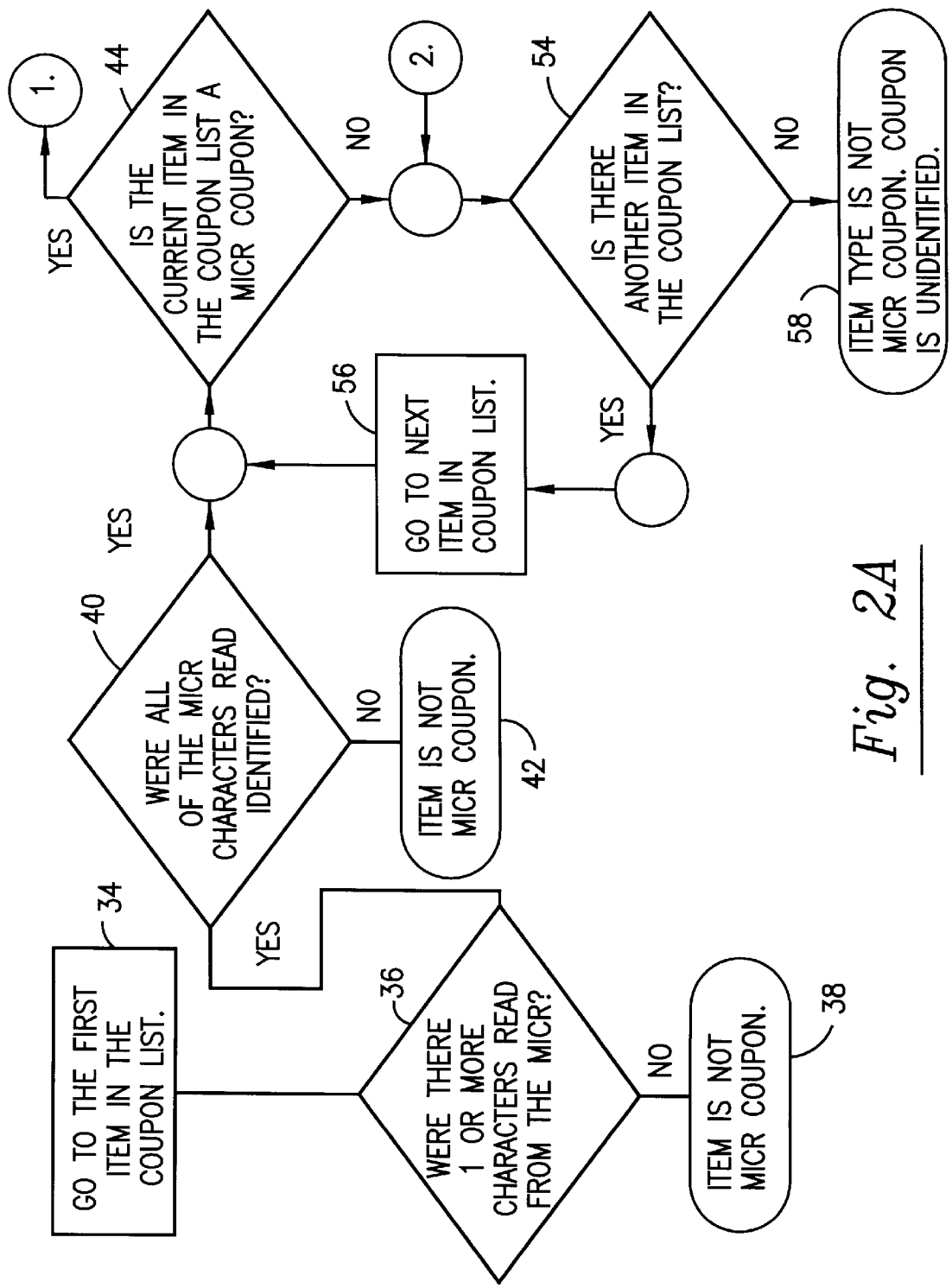
FIG. 2A–C is a logic diagram MICR coupon identification flowchart depicting in more detail the operations represented by blocks 30 and 32 of FIG. 1B.
Figure 2B:
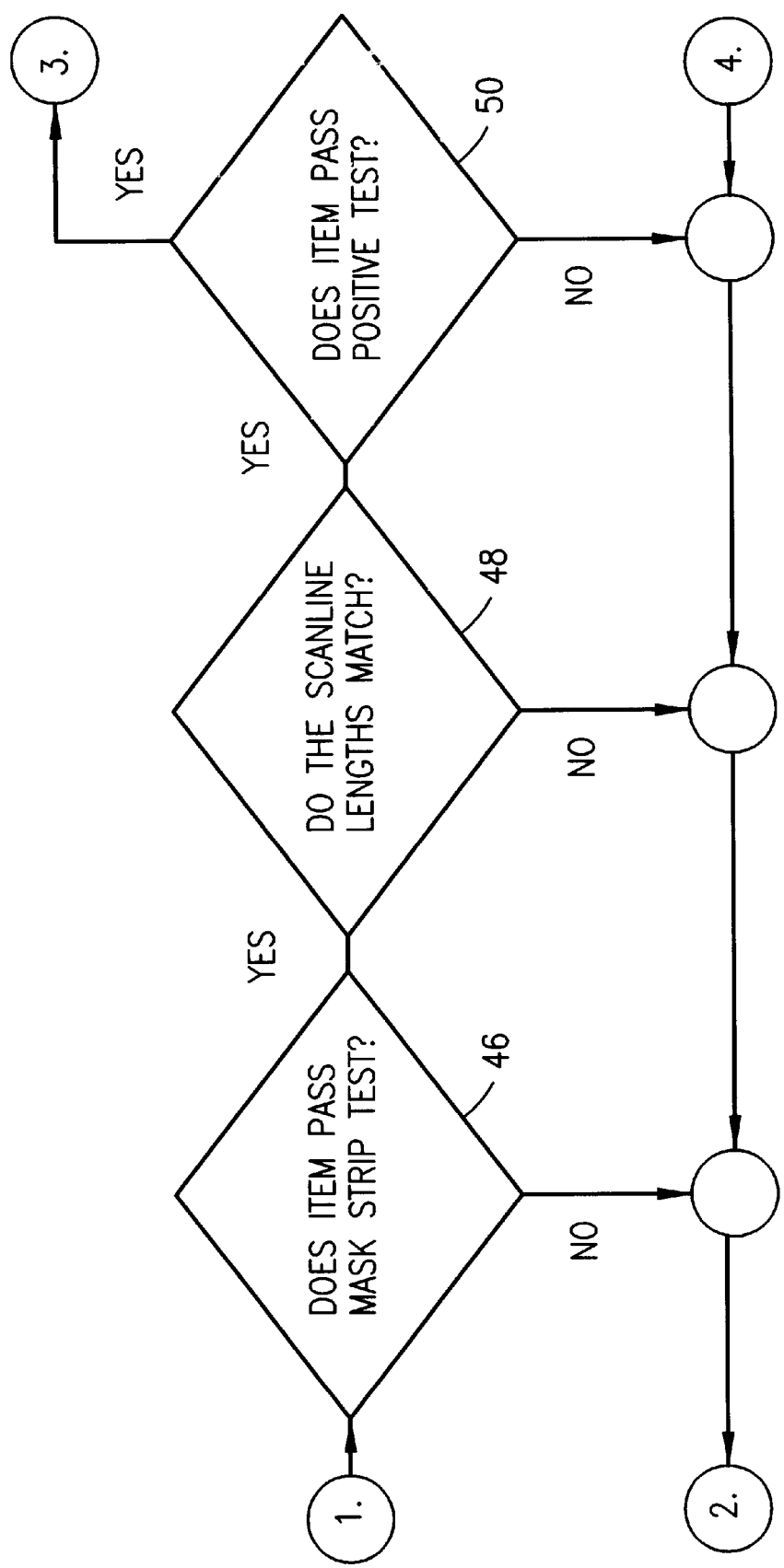
Figure 2C:
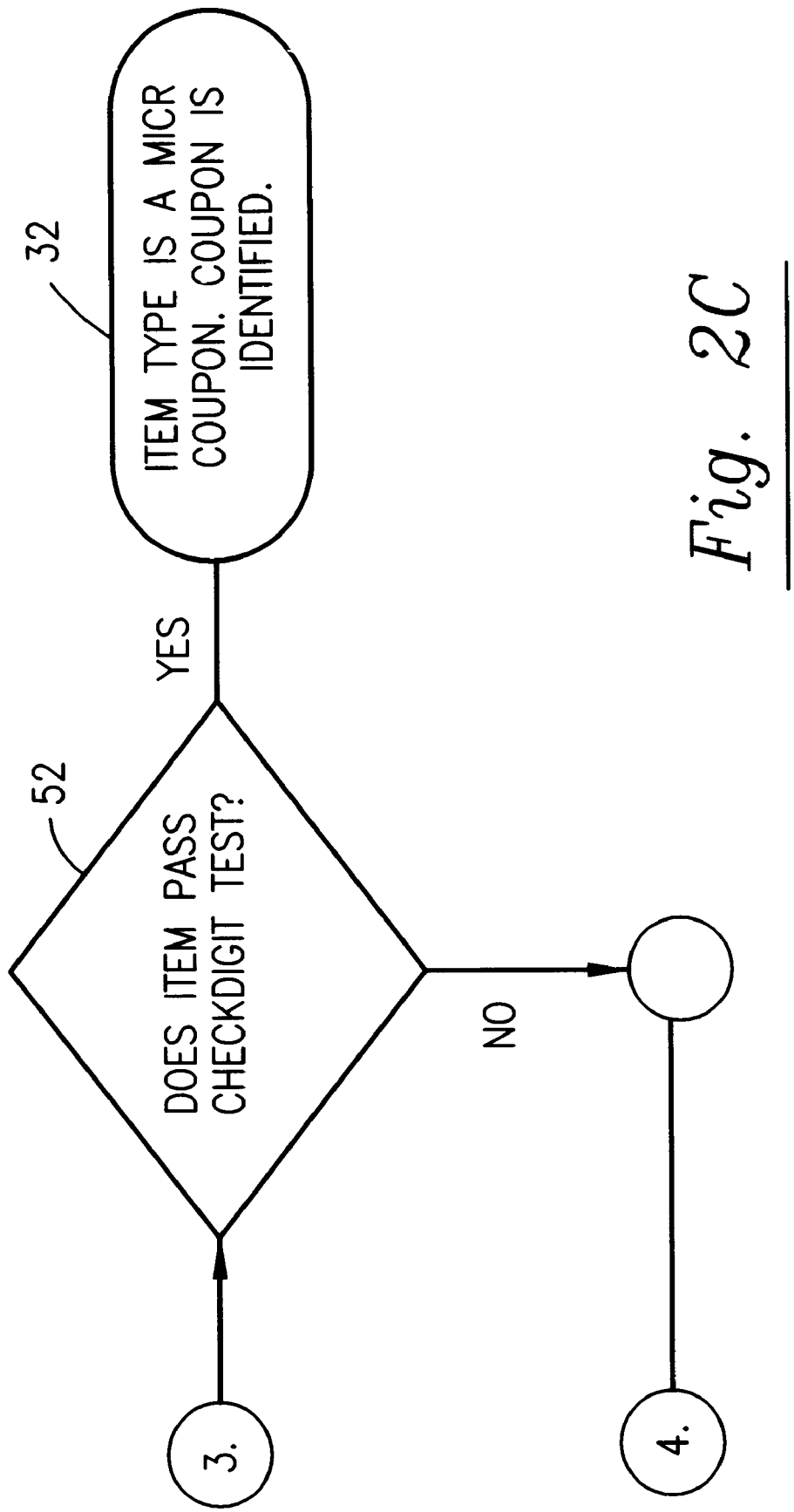
Figure 3A:
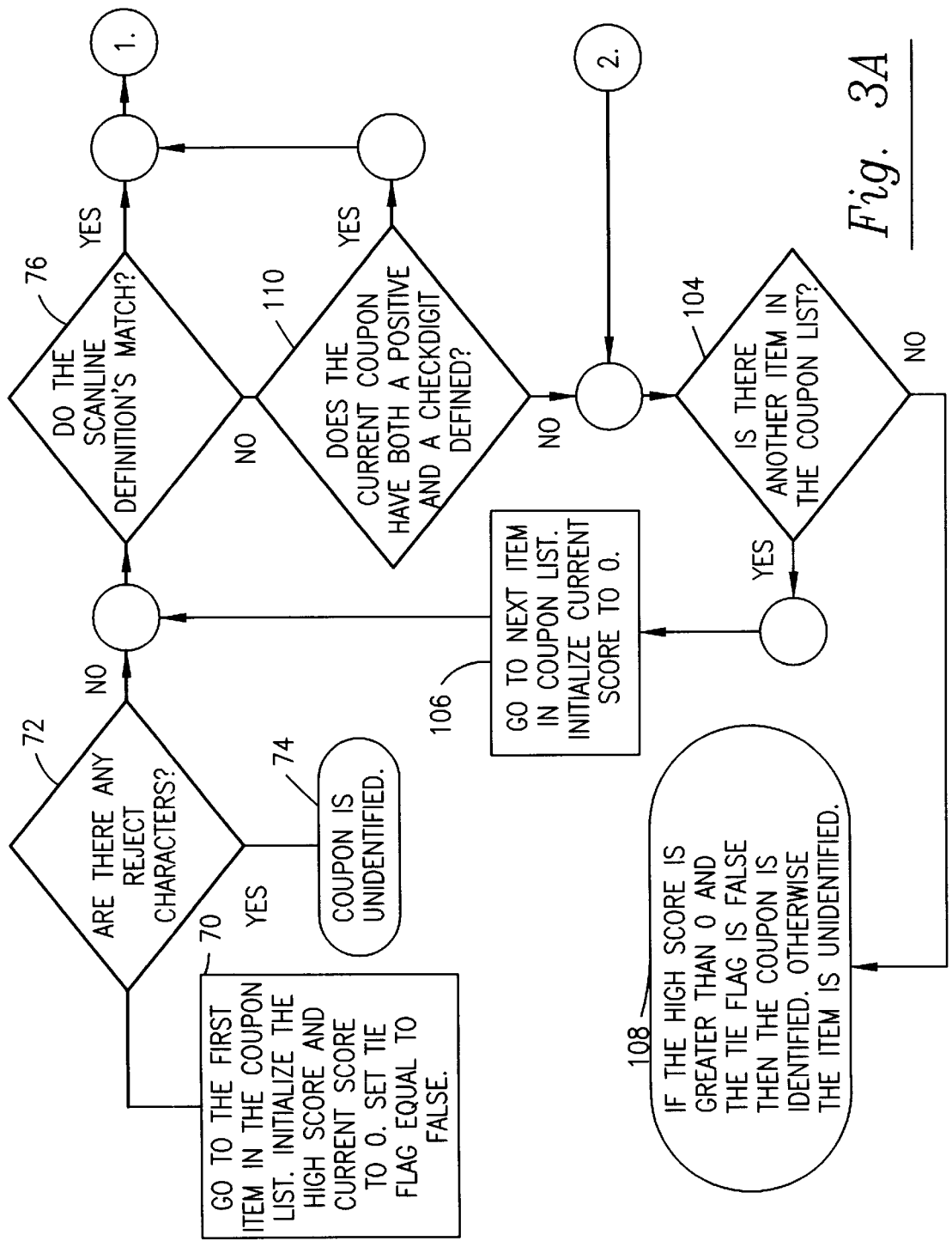
FIG. 3A–E is a logic diagram coupon identification flowchart depicting in more detail the operations represented by blocks 64–68 of FIG. 1C.
Figure 3B:
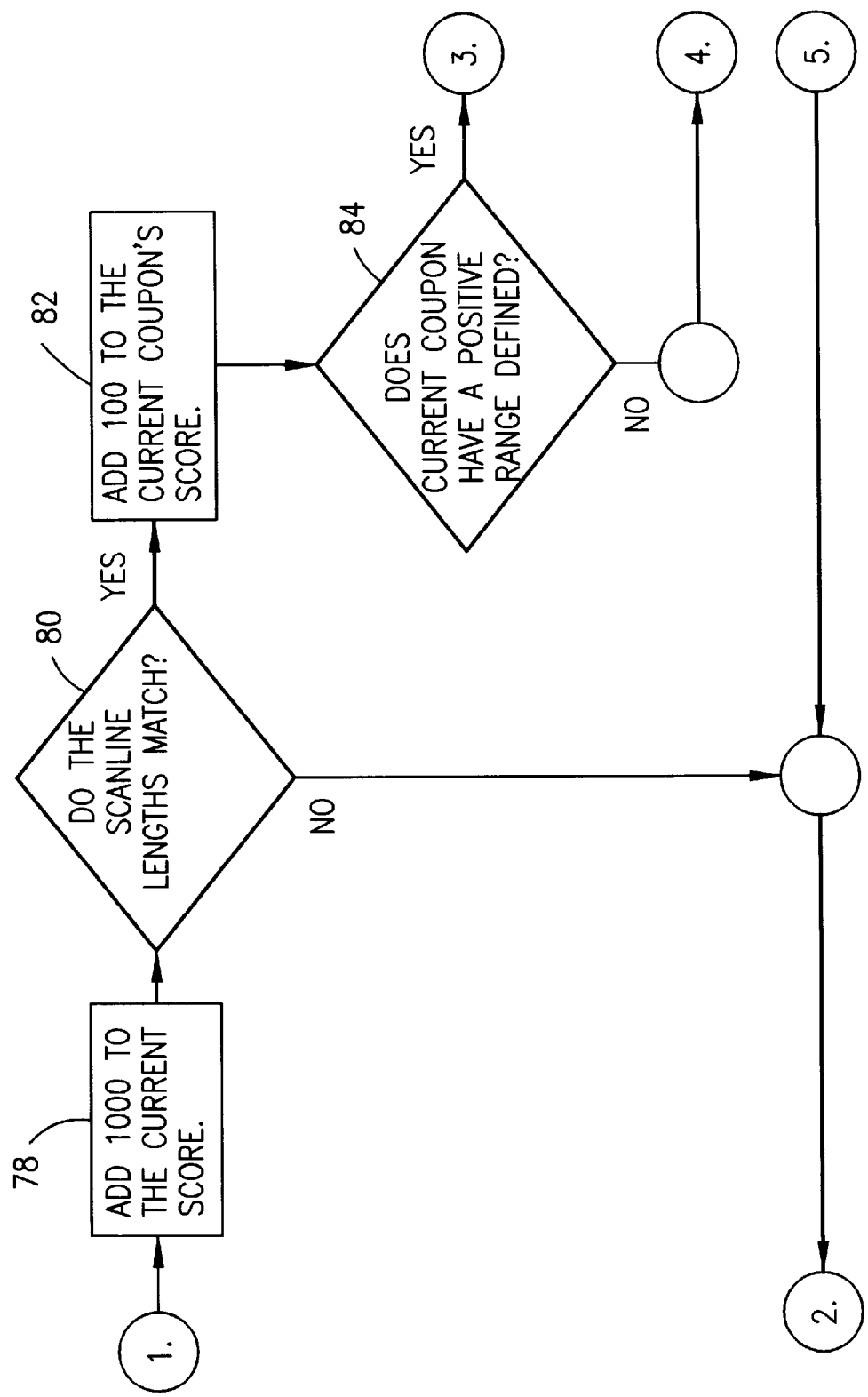
Figure 3C:
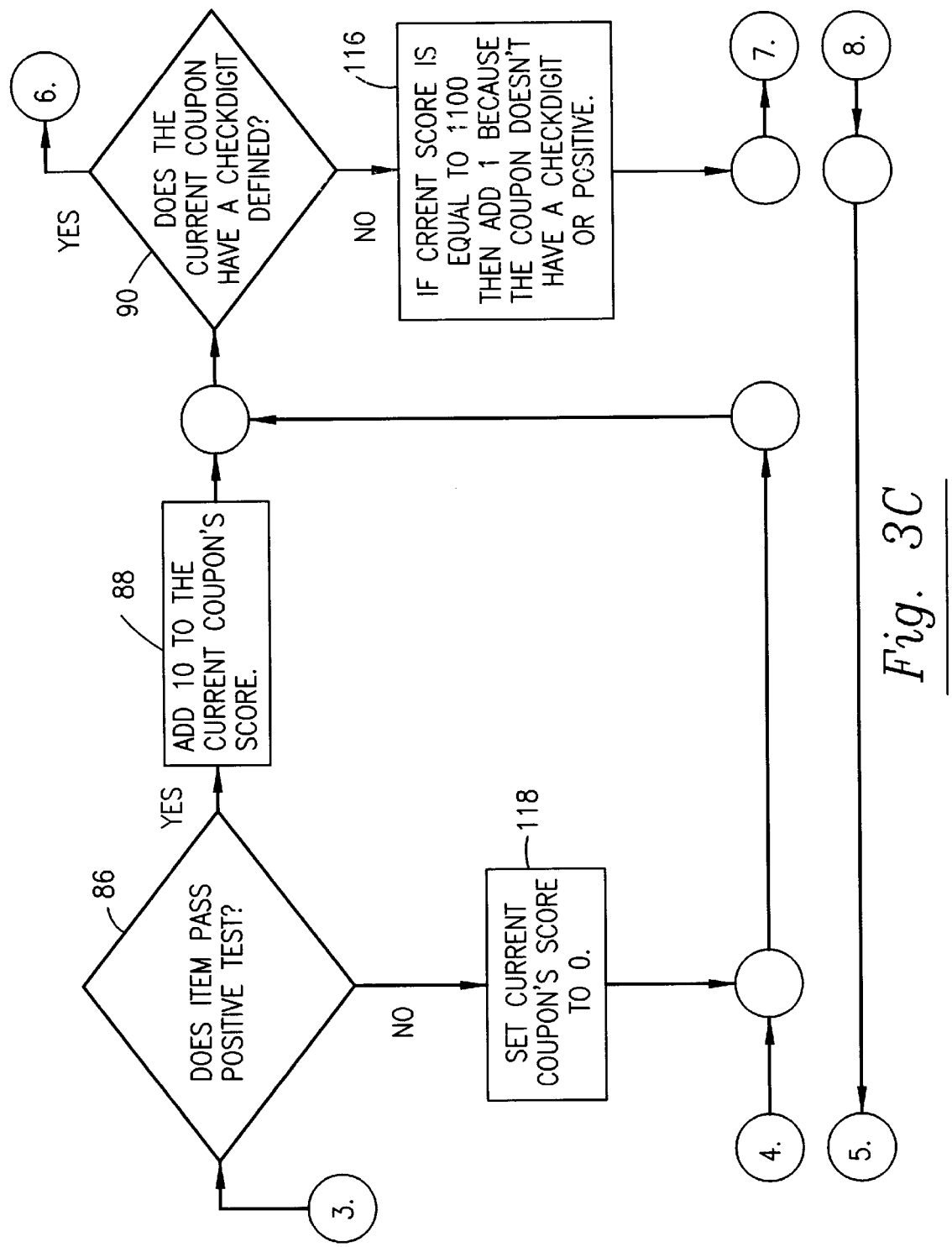
Figure 3D:
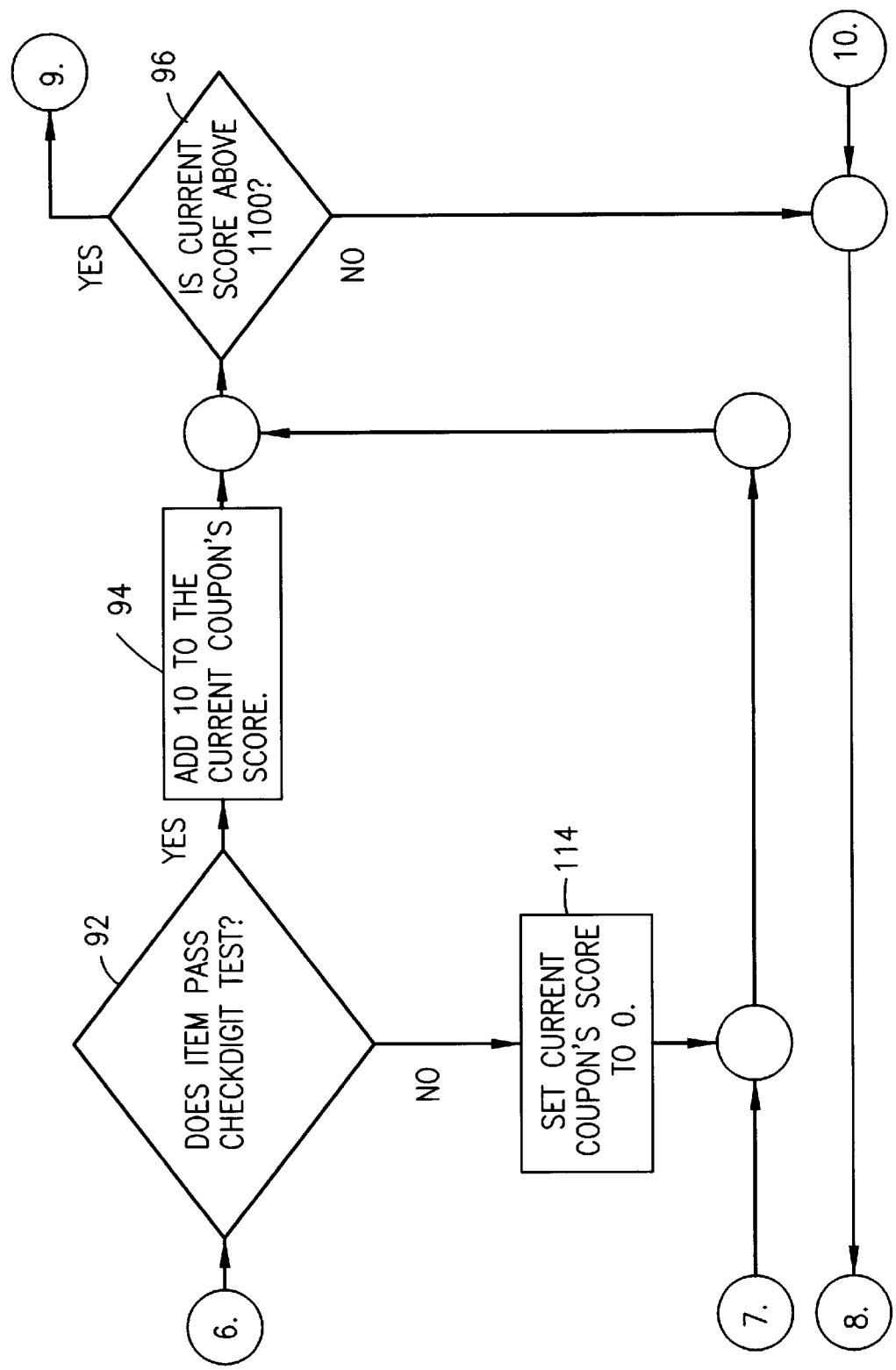
Figure 3E:
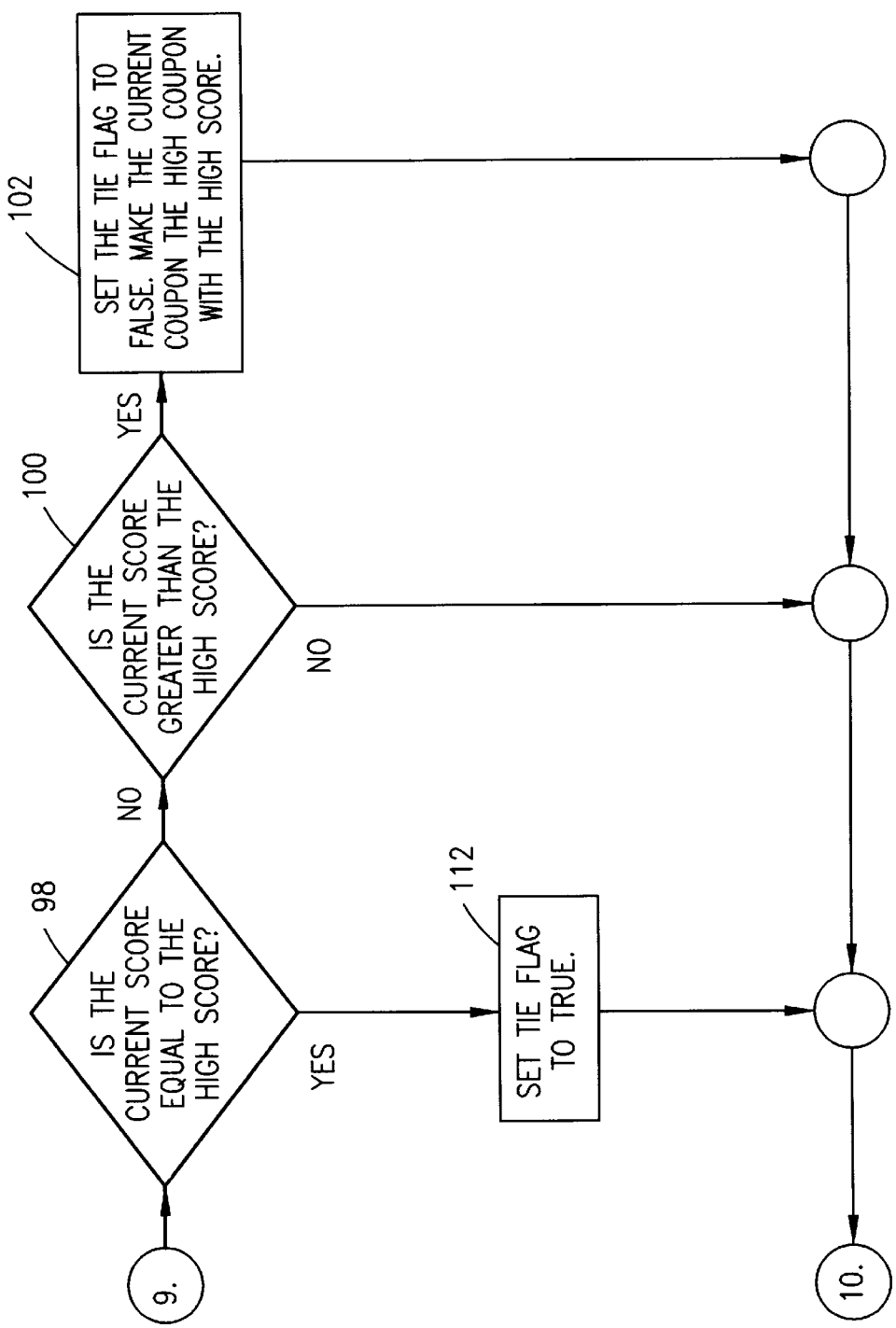

If the unidentified document is not a substitution coupon the unidentified document is further processed as illustrated at block 30. At block 30 it is determined if the unidentified document is a MICR coupon. In particular, a MICR coupon is an exception remittance coupon which contains a MICR scanline. This type of unidentified document is handled differently, as illustrated in FIG. 2 so that it is not mistaken for a check. If it is determined at block 30 that the unidentified document is a MICR coupon the document is identified as illustrated at block 32. The identification process of blocks 30–32 is illustrated in detail in FIG. 2.

As illustrated in FIG. 2 at block 34, the apparatus and method of the present invention reads the first item in the coupon list which was generated at block 12 of FIG. 1. The apparatus and method of the present invention at block 36 determines if one or more characters were read from the MICR of the unidentified document. If it is determined that one or more characters were not read from the MICR of the unidentified document then the unidentified document is not a MICR coupon and as illustrated at block 38 the unidentified document remains unidentified.

If one or more characters are read from the MICR of the unidentified document at block 36, it is then determined at block 40 if all of the MICR characters which were read are identified. If all of the MICR characters read are not identified, then as illustrated at block 42 the unidentified document is not a MICR coupon and it remains unidentified. If it is determined at block 40 that all of the MICR characters read were identified the unidentified document is a MICR coupon which is further processed at block 44. At block 44 it is determined whether or not the current item in the coupon list is a MICR coupon. If the current item in the coupon list is not a MICR coupon the unidentified document is further processed as discussed in further detail below.

If it is determined that the current item in the coupon list is a MICR coupon the unidentified MICR coupon is further processed at block 46 where it is determined if the unidentified MICR coupon passes a mask strip test. A mask is a template for a scanline. This template consists of characters that signify how the scanline should be formatted. For example, a "9" in the mask signifies that the character should be a number. A "#" means that any character or no character can be located in that position. A "-" signifies that there must be a dash (-) in that position. In order to pass the mask test the scanline which is being tested must overlay the mask and all of the characters must match. For example, if the mask is "999-999#" and the unidentified MICR coupon's scanline being tested is "123-456" the unidentified MICR coupon passes the mask strip test. If the unidentified MICR coupon's scanline being tested is "4444222" the unidentified MICR coupon fails the mask strip test because the dash (-) is not present in the test scanline. If the unidentified MICR coupon's scanline being tested is "333" then unidentified MICR coupon fails the mask strip test because the test scanline does not contain enough characters. If the unidentified MICR coupon's scanline being tested is "123-4567" the unidentified MICR coupon passes the mask strip test. Further, if the unidentified MICR coupon's scanline being tested is "123-45678" the unidentified MICR coupon fails the mask strip test because the test scanline has too many characters. If the unidentified MICR coupon does not pass the mask strip test the unidentified MICR coupon is further processes as discussed in more detail below.

If the unidentified MICR coupon passes the mask strip test at block 46 it is then determined at block 48 if the length of the scanline from the coupon list matches the length of the scanline from the unidentified MICR coupon. Specifically, scanline lengths are defined as the number of expected characters on a scanline. For every coupon defined in the coupon list a user has the ability to define a minimum and maximum length of the scanline for that particular coupon. This test involves checking the length of the scanline captured and being tested to determine if it is greater than or equal to the minimum defined in the coupon list and lesser than or equal to the maximum defined in the coupon list. If the scanline lengths do not match the unidentified MICR coupon is further processed as discussed in more detail below.

If it is determined that the scanline lengths match the unidentified MICR coupon is further processed at block 50 to determine if the unidentified MICR coupon passes a positive range test. A positive range is a set of numbers defined for a particular coupon that must be in the scanline of that coupon. These numbers can be defined as an exact number, such as, "123" or a range, such as, "100 - 200." The user also defines where on the scanline these numbers are located. For example, if the positive range test is "123" and defined with a start position of 2 and a length of 3. An unidentified MICR coupon having a scanline "2123456778" passes the positive range test. An unidentified MICR coupon having a scanline "2223333" fails the positive range test because "223" is not equal to "123." An unidentified MICR coupon having a scanline "91233" passes the positive range test. If no positive range is defined for a particular coupon then the coupon passes this test. If the unidentified MICR coupon fails the positive range test the unidentified MICR coupon is further processed as discussed in detail below.

If the unidentified MICR coupon passes the positive range test at block 50 the unidentified MICR coupon is further processed at block 52 where it is determined if the unidentified MICR coupon passes a checkdigit routine test. Checkdigit routines are mathematical methods that when applied calculate an acceptable character based on values applied to the equation. A user has the ability to define routines and apply those routines to segments of the scanline. If the defined routine is applied to the scanline of the unidentified MICR coupon and it passes the test is successful. If there is no defined checkdigit routine then the scanline of the unidentified MICR coupon passes the checkdigit routine test. If the unidentified MICR coupon passes the checkdigit routine test it is confirmed that the unidentified MICR coupon is in fact a MICR coupon and the coupon is identified as illustrated at block 32. If the unidentified MICR coupon fails the checkdigit routine test the unidentified MICR coupon is further processed as discussed in detail below.

As illustrated in FIG. 2 if during the identification of the unidentified MICR coupon at each of blocks 44, 46, 48, 50, and 52 the unidentified MICR coupon is not in the coupon list, the unidentified MICR coupon does not pass the mask strip test, the unidentified MICR coupon scanline length does not match the scanline length from the coupon list, the unidentified MICR coupon does not pass the positive range test, or the unidentified MICR coupon does not pass the checkdigit routine test, respectively, it must then be determined at block 54 if there is another item in the coupon list to which the unidentified MICR coupon can be compared with. If another item exists in the coupon list, the unidentified MICR coupon is then compared and tested against the next item in the coupon list as illustrated at block 56, repeating blocks 44, 46, 48, 50, and 52 until the unidentified MICR coupon is identified. If it is determined that no further item is in the coupon list, the unidentified MICR coupon is in fact not a MICR coupon and the coupon is unidentified as illustrated at block 58 and requires further processing in order that the document may be identified. This unidentified coupon requires further processing as illustrated in FIG. 1 beginning at block 60 in order to identify the document.

Returning now to FIG. 1, if at block 30 the unidentified document is not a MICR coupon, the unidentified document is further processed as illustrated at block 60. In particular, at block 60 the unidentified document is tested to determine if it could be a check. The unidentified document could be a check if more than seven (7) characters are read from the MICR line, and if eighty percent (80%) or more of the characters read from the MICR line are not rejected characters, and the scanline includes at least one (1) or two (2) transit/routing bounding characters.

Block 60 is followed by a comparison at block 62 of the unidentified document's hardware OCR read with the first scanline definition from the scanline definition list of block 14. At block 64, it is determined, based on the hardware OCR read, whether or not the document could be a coupon. Several conditions must be satisfied in order for the unidentified document to be a coupon. In particular, at least seventy-five percent (75%) of the characters of the unidentified document must be read. The minimum number of characters in the scanline is obtained from the coupon list at block 12. For example, the scanline of the unidentified document contains twenty-five (25) characters and twenty (20) characters were read. The read rate is eighty percent (80%) so the unidentified document passes. In addition, at least fifty percent (50%) of the characters read from the scanline must not be reject characters. If the unidentified document fails either or both of these conditions, the document is processed further as discussed in detail below.

If the unidentified document has a read rate of at least seventy-five percent (75%) of the characters in the scanline and at least fifty percent (50%) of the characters read from the scanline are not reject characters the unidentified document is processed further at block 66 where it is determined if based on the OCR read it is possible to identify the unidentified document. If the unidentified document is identifiable based on the OCR read then the unidentified document is a coupon and the coupon is identified as illustrated at block 68. The identification of an unidentified document based on the OCR read is illustrated in further detail in FIG. 3.

As illustrated in FIG. 3 at block 70, starting with the first item in the coupon list at block 12, the high score is initialized and the current coupon's score is set to zero (0). In addition, a tie flag is set equal to false. At block 72 it is determined if there are any reject characters. If reject characters are present in the OCR read the unidentified document remains unidentified as illustrated at block 74. If no reject characters are present in the OCR read the unidentified document is further processed at block 76 where it is determined if the scanline definitions match. This test involves checking scanline definition in the coupon list's scanline definition against the scanline of the unidentified document. If all of the defined parameters including, but not limited to height, position and font match then the unidentified document passes the test. If all of the scanline definitions match, one thousand (1000) is added to the current coupon's score as illustrated at block 78.

After adding one thousand (1000) to the current coupon's score at block 78, it is then determined if the scanline lengths of the current coupon and the unidentified document match as illustrated at block 80. In particular, scanline lengths are defined as the number of expected characters on a scanline. For every coupon defined in the coupon list a user has the ability to define a minimum and maximum length of the scanline for that particular coupon. This test involves checking the length of the scanline captured and being tested to determine if it is greater than or equal to the minimum defined in the coupon list and lesser than or equal to the maximum defined in the coupon list. If the scanline lengths match then 100 is added to the current coupon's score at block 82.

After adding 100 to the current coupon's score at block 82 it is then determined at block 84 whether or not the current coupon has a defined positive range. If it is determined at block 84 that the current coupon has a defined positive range then it must be determined at block 86 if the unidentified document passes the positive range test. A positive range is a set of numbers which is defined for a particular coupon that must be in the scanline of that coupon. This set of numbers can be defined as an exact number or as a range of numbers. A user also defines where on the scanline these numbers must be located. If no positive range is defined for the current coupon then the unidentified document passes the positive range test. If the unidentified document passes the positive range test at block 86, ten (10) is added to the current coupon's score at block 88.

After adding ten (10) to the current coupon's score at block 88 it is then determined at block 90 if the current coupon has a defined checkdigit routine. If the current coupon has a defined checkdigit routine it must then be determined at block 92 if the unidentified document passes the checkdigit routine test. If the defined routine is applied to the unidentified document's scanline and the unidentified document passes, the checkdigit routine test was successful. If there is no checkdigit routine defined then the unidentified document passes the checkdigit routine test.

If the unidentified document passes the checkdigit routine test, ten (10) is added to the current coupon's score at block 94. After adding ten (10) to the current coupon's score at block 94 it must then be determined at block 96 if the current coupon's score is above eleven hundred (1100). If the current coupon's score is above eleven hundred (1100), then it is determined at block 98 if the current coupon's score is equal to the high score. If the current coupon's score is not equal to the high score, it is determined at block 100 if the current coupon's score is greater than the high score. If the current coupon's score is greater than the high score the tie flag is set to false at block 102 and the current coupon's score is made the high coupon with the high score. After the current coupon is made the high coupon with the high score it is determined at block 104 whether or not there is another item in the coupon list. If there is another item in the coupon list, going to the next item in the coupon list at block 12, the high score which is also the current score is initialized and is set to zero (0) at block 106. After the current score is initialized and set to zero (0) the functions at blocks 76–102 are repeated in an attempt to identify the unidentified document.

If it is determined at block 104 that no other items exist in the coupon list and as illustrated at block 108 the high score is greater than zero (0) and the tie flag is false then the unidentified coupon is identified. If these conditions are not met the unidentified document remains unidentified.

At block 100, if it is determined that the score of the current coupon is not greater than the high score it is then determined at block 104 whether or not there is another item in the coupon list. If there is another item in the coupon list, going to the next item in the coupon list at block 12, the high score which is also the current score is initialized and is set to zero (0) at block 106. After the current score is initialized and set to zero (0) the functions at blocks 76–102 are repeated in an attempt to identify the unidentified document.

If it is determined at block 104 that no other items exist in the coupon list and as illustrated at block 108 the high score is greater than zero (0) and the tie flag is false then the unidentified coupon is identified. If these conditions are not met the unidentified document remains unidentified.

At block 98 if it is determined the score of the current coupon is equal to the high score, the tie flag is set to true at block 112. After the tie flag is set to true at block 112 it is then determined at block 104 whether or not there is another item in the coupon list. If there is another item in the coupon list, going to the next item in the coupon list at block 12, the high score which is also the current score is initialized and is set to zero (0) at block 106. After the current score is initialized and set to zero (0) the functions at blocks 76–102 are repeated in an attempt to identify the unidentified document.

If it is determined at block 104 that no other items exist in the coupon list and as illustrated at block 108 the high score is greater than zero (0) and the tie flag is false then the unidentified document is identified. If these conditions are not met the unidentified document remains unidentified.

At block 96 if it is determined that the score of the current coupon is not above eleven hundred (1100) it is then determined at block 104 whether or not there is another item in the coupon list. If there is another item in the coupon list, going to the next item in the coupon list at block 12, the high score which is also the current score is initialized and is set to zero (0) at block 106. After the current score is initialized and set to zero (0) the functions at blocks 76–102 are repeated in an attempt to identify the unidentified document.

If it is determined at block 104 that no other items exist in the coupon list and as illustrated at block 108 the high score is greater than zero (0) and the tie flag is false then the unidentified coupon is identified. If these conditions are not met the unidentified document remains unidentified.

At block 92 if it is determined that the unidentified document does not pass the checkdigit routine test, the score of the current coupon is set to zero (0) at block 114. After the score of the current coupon is set to zero (0) at block 114 the unidentified document is further processed at blocks 96–102.

If at block 90 it is determined that the current coupon does not have a defined checkdigit routine, it is then determined at block 116 if the score of the current coupon equals eleven hundred (1100). If the score of the current coupon equals eleven hundred (1100), one is added to the score of the current coupon because the coupon does not have a checkdigit routine or a positive range. After one is added to the score of the current coupon, the unidentified document is further processed at blocks 96–102.

At block 86, if the unidentified document does not pass a positive range test the current coupon's score is set to zero (0) at block 118. After the score of the current coupon is set to zero (0) at block 118, the unidentified document is further processed at blocks 90–102. At block 84, if it is determined that the current coupon does not have a defined positive range, the unidentified document is processed further at blocks 90–102. At block 80, if it is determined that the scanline lengths do not match the unidentified document is further processed at block 104 where it is determined whether or not there is another item in the coupon list. If there is another item in the coupon list, going to the next item in the coupon list at block 12, the high score which is also the current score is initialized and is set to zero (0) at block 106. After the current score is initialized and set to zero (0) the functions at blocks 76–102 are repeated in an attempt to identify the unidentified document.

If it is determined at block 104 that no other items exist in the coupon list and as illustrated at block 108 the high score is greater than zero (0) and the tie flag is false then the unidentified document is identified. If these conditions are not met the unidentified document remains unidentified.

At block 76, if it is determined that the scanline definitions do not match, it is then determined at block 110 whether or not the current coupon has both a defined positive range and a checkdigit routine. If it is determined at block 110 that the current coupon does not have defined both a positive range and a checkdigit routine, it is then determined at block 104 if there is another item in the coupon list and the unidentified document is further processed at blocks 108, 106 and 76–102. If it is determined at block 110 that the current coupon has defined both a positive range and a checkdigit routine, the unidentified document is further processed at blocks 78–102.

Returning to FIG. 1, if at block 66, it is determined that based on the OCR read the unidentified document is not identifiable it is then determined at block 120 if there are additional scanline definitions in the scanline definition list at block 14. If additional scanline definitions exist, at block 122 the image size of the unidentified document is retrieved and compared to the next scanline definition in the scanline definition list. At block 124 it is then determined if the retrieved image size of the unidentified document matches the current scanline definition. In particular, the list of coupon sizes associated with the current scanline definition is gone through. Each size is tested to determine if both the height and the width are within four percent (4%) of the unidentified document captured. If the size associated with the current scanline definition and the unidentified captured document are within four percent (4%) of each other there is a size match. If it is determined at block 124 that a size match exists, a software OCR read is performed with the current scanline definition at block 126. After the software OCR read at block 126 the unidentified document is further processed at blocks 64, 66, 120, 122, 124 and 126.

If at block 120 it is determined that there are no additional scanline definitions in the scanline definition list, at block 128 the unidentified document type is determined based on the previous OCR and MICR reads. Specifically, if the unidentified document could be a coupon and it could be a check the unidentified document is undetermined. If the unidentified document could be a coupon but could not be a check the unidentified document is determined to be a coupon. If the unidentified document could not be a coupon but could be a check then the unidentified document is determined to be a check. If the unidentified document could not be a coupon and could not be a check the unidentified document is determined to be a coupon due to a misread and the unidentified document requires operator intervention in order to identify the document.

As illustrated at block 130, the unidentified document is determined to be a check, a coupon or undetermined, the document is unidentified which requires operator intervention. If at block 64, the unidentified document could not be a coupon based on the OCR read, the unidentified document is further processed beginning at block 120.

It will thus be seen that the objects set forth above, and those made apparent from the foregoing description, are efficiently attained and since certain changes may be made in the foregoing construction without departing from the scope of the invention, it is intended that all matters contained in the foregoing construction or illustrated in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

It is intended that the specification and examples be considered as exemplary only, with the true scope and spirit of the invention being indicated in the following claims.

Now that the invention has been described,

What is claimed is:

1. A data processing system for identifying documents, from one or more business entities in a mixed document environment, comprising:

means for entering a plurality of information parameters from a plurality of known documents of different sizes from the one or more business entities, the known documents comprising multiple coupons, multiple checks, multiple cash-in tickets, and multiple batch tickets;

means for storing in memory the plurality of information parameters from the plurality of known documents to create a first data list containing a discrete entry for each information parameter of each known document;

means for reading a plurality of information parameters from a plurality of unknown documents of different sizes from the one or more business entities, the unknown documents comprising multiple coupons, multiple checks, multiple cash-in tickets, and multiple batch tickets;

means for storing in volatile memory the plurality of information parameters from the plurality of unknown documents to create a second data list containing a discrete entry for each information parameter of each unknown document;

means for sequentially comparing each discrete entry of the second data list with each discrete entry of the first data list;

means responsive to the sequential comparing means for determining if a match exists between a discrete entry of the second data list and a discrete entry of the first data list, whereby each unknown document is identified.

2. The data processing system according to claim 1, further comprising:

means for processing each identified document.

3. The data processing system according to claim 2, further comprising:

means for sorting identified documents to provide groups of like identified documents.

4. A data processing method for identifying documents, from one or more business entities in a mixed document environment, comprising the steps of:

entering a plurality of information parameters from a plurality of known documents of different sizes from the one or more business entities, the known documents comprising multiple coupons, multiple checks, multiple cash-in tickets, and multiple batch tickets;

storing in memory the plurality of information parameters from the plurality of known documents to create a first data list containing a discrete entry for each information parameter of each known document;

reading a plurality of information parameters from a plurality of unknown documents of different sizes from the one or more business entities, the unknown documents comprising multiple coupons, multiple checks, multiple cash-in tickets, and multiple batch tickets;

storing in volatile memory the plurality of information parameters from the plurality of unknown documents to create a second data list containing a discrete entry for each information parameter of each unknown document;

sequentially comparing each discrete entry of the second data list with each discrete entry of the first data list to determine if a match exists, whereby each unknown document is identified.

5. The data processing method according to claim 4, further comprising:

processing each identified document.

6. The data processing method according to claim 5, further comprising:

sorting identified documents to provide groups of like identified documents.

* * * * *